(12) United States Patent
Haga

(10) Patent No.: US 9,885,944 B2
(45) Date of Patent: Feb. 6, 2018

(54) IMAGE DISPLAY ELEMENT HOLDING MECHANISM, PRISM UNIT, AND PROJECTOR

(71) Applicant: Konica Minolta, Inc., Tokyo (JP)

(72) Inventor: Daisuke Haga, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 51 days.

(21) Appl. No.: 14/894,283

(22) PCT Filed: May 28, 2014

(86) PCT No.: PCT/JP2014/064075
§ 371 (c)(1),
(2) Date: Nov. 25, 2015

(87) PCT Pub. No.: WO2014/192794
PCT Pub. Date: Dec. 4, 2014

(65) Prior Publication Data
US 2016/0116831 A1    Apr. 28, 2016

(30) Foreign Application Priority Data

May 30, 2013  (JP) ................................. 2013-114125
Jun. 6, 2013  (JP) ................................. 2013-119628

(51) Int. Cl.
*G02F 1/1333*    (2006.01)
*G03B 21/00*    (2006.01)
(Continued)

(52) U.S. Cl.
CPC ......... *G03B 21/142* (2013.01); *G02B 7/1805* (2013.01); *G03B 21/145* (2013.01);
(Continued)

(58) Field of Classification Search
CPC . G02F 1/133308; G03B 21/142; G03B 33/12; G03B 21/147; G03B 21/145;
(Continued)

(56) References Cited

U.S. PATENT DOCUMENTS 6,056,407 A  *  5/2000  Iinuma ............... G02B 27/1046
                                          348/E5.141
7,114,816 B2 *  10/2006  Fujimori ............. H04N 9/3105
                                          348/750
(Continued)

FOREIGN PATENT DOCUMENTS

JP      H10-10994 A    1/1998
JP      2001-021989 A  1/2001
(Continued)

OTHER PUBLICATIONS

International Search Report issued in corresponding International Application No. PCT/JP2014/064075 dated Aug. 5, 2014, and English translation thereof (6 pages).
(Continued)

*Primary Examiner* — Ryan Howard
(74) *Attorney, Agent, or Firm* — Osha Liang LLP

(57) ABSTRACT

A holding mechanism for holding an image display element to a prism includes: a first fixing member fixed to the prism by an adhesive; and a second fixing member, which is fixed to the first fixing member using a screw, and which has the image display element directly or indirectly fixed to the second fixing member. A protruding section is provided at the periphery of a hole to be used for the purpose of fixing using the screw, and at the time of fixing the second fixing member to the first fixing member using the screw, the first fixing member and the second fixing member are directly or indirectly brought into contact with each other at the protruding section such that deformation due to screwing of the
(Continued)

screw does not generate within a bonding region of the first fixing member.

20 Claims, 11 Drawing Sheets

(51) Int. Cl.
| | | |
|---|---|---|
| *H04N 9/31* | (2006.01) | |
| *G03B 21/14* | (2006.01) | |
| *G02B 7/18* | (2006.01) | |
| *G03B 33/12* | (2006.01) | |
| *G03B 33/06* | (2006.01) | |
| *G03B 21/20* | (2006.01) | |

(52) U.S. Cl.
CPC ........... *G03B 21/147* (2013.01); *G03B 33/12* (2013.01); *H04N 9/317* (2013.01); *G02F 1/133308* (2013.01); *G03B 21/005* (2013.01); *G03B 21/006* (2013.01); *G03B 21/008* (2013.01); *G03B 21/2066* (2013.01); *G03B 33/06* (2013.01); *H04N 9/3141* (2013.01)

(58) Field of Classification Search
CPC ............... G03B 21/006; G03B 21/008; G03B 21/2066; G03B 21/005; G03B 33/06; G02B 7/1805; H04N 9/317; H04N 9/3141
USPC .......................................... 349/5, 7, 8, 9, 10
See application file for complete search history.

(56) References Cited

U.S. PATENT DOCUMENTS

| | | | |
|---|---|---|---|
| 7,152,979 B2 | 12/2006 | Ellis et al. | |
| 2004/0114249 A1* | 6/2004 | Nishihara | G03B 21/006 |
| | | | 359/617 |

FOREIGN PATENT DOCUMENTS

| | | |
|---|---|---|
| JP | 2002-350813 A | 12/2002 |
| JP | 2003-207639 A | 7/2003 |
| JP | 2003-295789 A | 10/2003 |
| JP | 2006-003826 A | 1/2006 |
| JP | 2011-150109 A | 8/2011 |
| JP | 2012-001105 A | 1/2012 |

OTHER PUBLICATIONS

Written Opinion of the International Searching Authority issued in PCT/JP2014/064075 dated Aug. 5, 2014, with translation (16 pages).

* cited by examiner

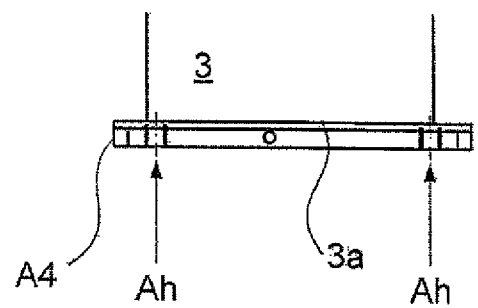
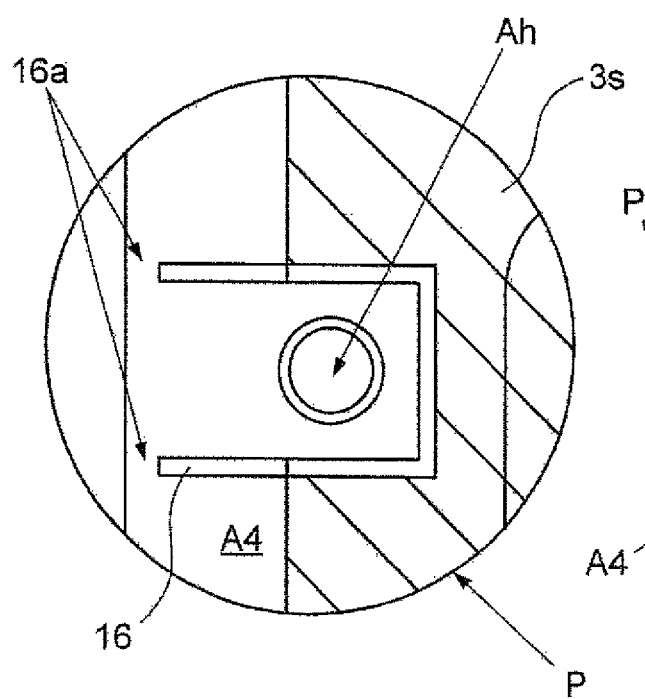
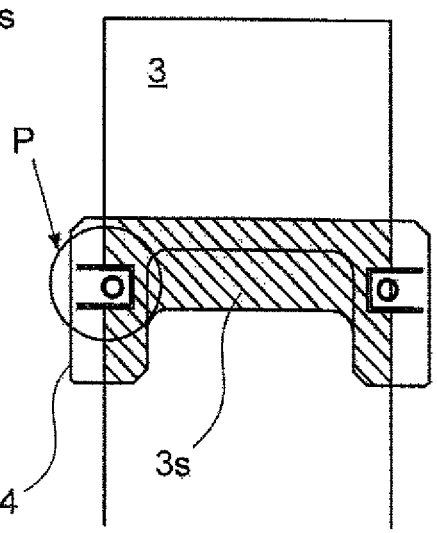

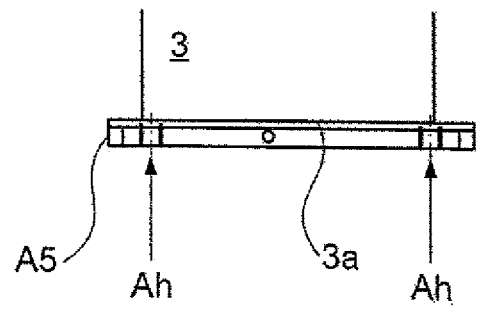
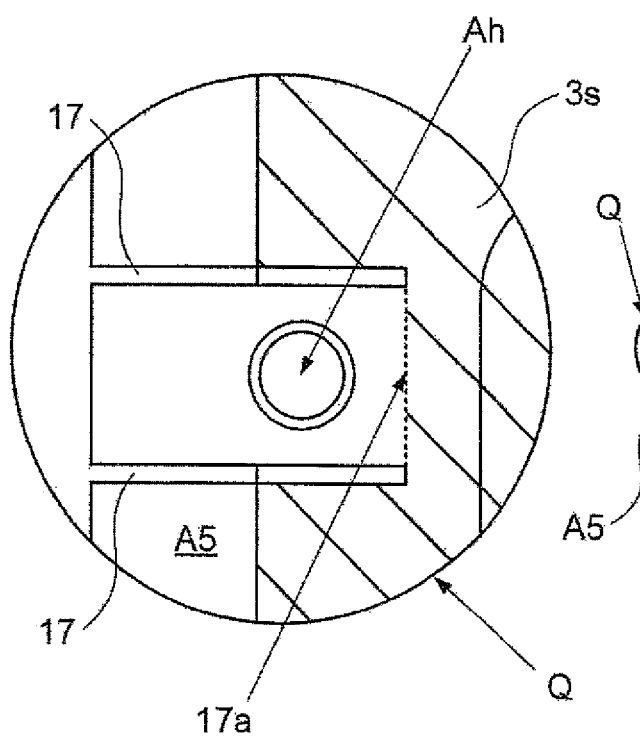
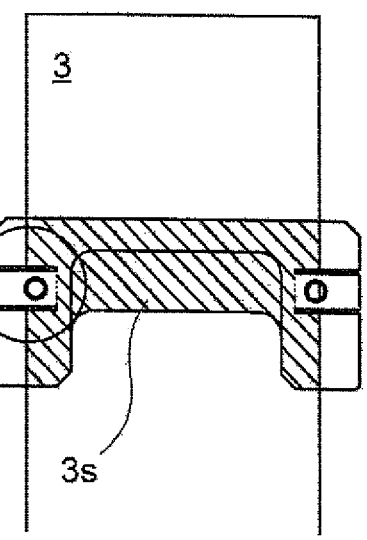

IMAGE DISPLAY ELEMENT HOLDING MECHANISM, PRISM UNIT, AND PROJECTOR

The present U.S. patent application is a U.S. National phase Application under 35 U.S.C. 371 of International Application PCT/JP2014/064075 filed on May 28, 2014. This application claims a priority under the Paris Convention of Japanese Patent Applications No. 2013-114125 filed on May 30, 2013, and No. 2013-119628 filed on Jun. 6, 2013, the entirety of each of which is incorporated herein by reference.

TECHNICAL FIELD

The present invention relates to an image display element holding mechanism, a prism unit, and a projector. The present invention more specifically relates to, for example, a holding mechanism for holding an image display element such as a liquid crystal panel, a digital micromirror device, or the like on a prism, a prism unit formed by integrating an image display element and a prism with each other with the holding mechanism, and a projector including the prism unit.

BACKGROUND ART

Recent years have been observing an increasingly more widespread use of projectors configured to project image light formed by an image display element such as a liquid crystal panel, a digital micromirror device, or the like onto a screen to thereby project an image onto the screen in an enlarged manner. In such projectors, an image display element and a prism are integrated with each other with an adhesive agent, but with the use of an adhesive agent, internal stress occurs mainly at an adhesion portion due to contraction force of the adhesive agent as it hardens, and the internal stress sometimes causes distortion of a member fixing the image display element, which may give rise to displacement of pixels. As a measure to prevent this inconvenience, Patent Literature 1 listed below proposes providing a cut in a fixing frame, and Patent Literature 2 listed below proposes providing a hole in a fixing frame to reduce thermal distortion of the fixing frame caused by, for example, variation of environmental temperature.

Patent Literature 3 listed below proposes integrating an image display element and a prism with each other with a member to which the prism is fixed with an adhesive agent and a member screwed on the member to which the prism is fixed. Such use of two kinds of members for holding an optical element facilitates fine adjustment of positions of a plurality of image display elements, and thus facilitates removal of the image display elements for replacement, too.

CITATION LIST

Patent Literature

Patent Literature 1 Japanese Patent Application Publication No. 2011-150109
Patent Literature 2 Japanese Patent Application Publication No. 2006-3826
Patent Literature 3 U.S. Pat. No. 7,152,979 B2

As described above, in a case where two different kinds of members are used as fixing members for integrating an image display element and a prism with each other, with the configurations proposed in Patent Literatures 1 to 3, there is a risk that the screwing between the fixing members may have adverse effects on an adhesion surface. Specifically, assuming that one of the two members to which the prism adheres is a first fixing member and the other to which the image display element is fixed is a second fixing member, when the second fixing member is fixed to the first fixing member by tightening a screw into them, tightening force (axial force) is applied between the first and second fixing members, and if there is a warp or poor flatness in contact surfaces of the first and second fixing members, bending stress will be generated. There is a risk that the bending stress may cause the prism on the adhesion surface to chip, or cause the adhesive agent to come off, to reduce adhesive strength between the prism and the first fixing member. Moreover, even a product produced as a non-defective product may suffer from gradual coming-off or warping of the adhesive agent over time. Even though the measures described in Patent Literatures 1 and 2 are helpful to make improvements related to heat, it has been recognized, on replacing or adjusting a plurality of image display elements, that warping of the prism, coming-off of the adhesive agent, and the like are caused.

SUMMARY OF THE INVENTION

One or more embodiments of the present invention provide an image display element holding mechanism configured such that bending stress generated by the tightening of a screw between fixing members is prevented from being applied to an adhesion surface of a prism with respect to a fixing member, a prism unit including the holding mechanism, and a projector.

According to a first aspect of the present invention, an image display element holding mechanism for holding an image display element on a prism includes a first fixing member that is fixed to a prism with an adhesive agent, and a second fixing member that is fixed to the first fixing member with a screw, and to which an image display element is directly or indirectly fixed. Here, a protrusion is formed around a hole used for fixing with the screw, and the first fixing member and the second fixing member contact each other directly or indirectly at the protrusion so as to prevent distortion from being caused in an adhesion area of the first fixing member by tightening of the screw when fixing the first fixing member to the second fixing member with the screw.

According to a second aspect of the present invention, in the image display element holding mechanism according to the first aspect of the present invention described above, the protrusion is integrally formed with at least one of the first fixing member and the second fixing member.

According to a third aspect of the present invention, in the image display element holding mechanism according to the first aspect of the present invention described above, the protrusion is constituted by a spacer detachable from the first fixing member and the second fixing member.

According to a fourth aspect of the present invention, in the image display element holding mechanism according to any one of the first to third aspects of the present invention described above, the protrusion has a height that is equal to or larger than a sum of a flatness of a surface of the first fixing member and a flatness of a surface of the second fixing member, the surface of the first fixing member and the surface of the second fixing member facing each other, such that the surface of the first fixing member and the surface of the second fixing member facing each other are prevented from contacting each other at positions other than a position at which the first fixing member and the second fixing member are fixed to each other with the screw.

According to a fifth aspect of the present invention, in the image display element holding mechanism according to any one of the first to fourth aspects of the present invention described above, the protrusion is disposed so as to circularly surround the hole used for the fixing with the screw.

According to a sixth aspect of the present invention, an image display element holding member for holding an image display element on a prism includes a first fixing member that is fixed to the prism with an adhesive agent, and a second fixing member that is fixed to the first fixing member with a screw, and to which the image display element is directly or indirectly fixed. Here, the first fixing member includes a buffer portion that absorbs bending stress generated by tightening of the screw when fixing the second fixing member to the first fixing member with the screw.

According to a seventh aspect of the present invention, in the image display element holding mechanism according to the sixth aspect of the present invention described above, the first fixing member includes a gap or a cut disposed between an adhesion surface of the first fixing member with respect to the prism and a position at which the tightening of the screw is received, and the buffer portion is formed by providing the gap or the cut.

According to an eighth aspect of the present invention, in the image display element holding mechanism according to the sixth aspect of the present invention described above, the first fixing member includes a thin-walled portion formed by providing a recess between an adhesion surface of the first fixing member with respect to the prism and a position at which the tightening of the screw is received, and the buffer portion is constituted by the thin-walled portion.

According to a ninth aspect of the present invention, in the image display element holding mechanism according to any one of the sixth to eighth aspects of the present invention described above, a relative position of the image display element with respect to the prism is adjustable by performing the tightening of the screw against biasing force between the first fixing member and the second fixing member.

According to a tenth aspect of the present invention, in a prism unit, the image display element and the prism are integrated with each other with the image display element holding mechanism according to any one of the first to ninth aspects of the present invention described above.

According to an eleventh aspect of the present invention, a projector includes the prism unit according to the tenth aspect of the present invention described above.

ADVANTAGEOUS EFFECTS OF ONE OR EMBODIMENTS OF THE INVENTION

According to an image display element holding mechanism of one or more embodiments of the present invention, it is possible to prevent bending stress generated by tightening of a screw between fixing members from being applied to an adhesion surface of a prism with respect to a fixing member. As a result, it is possible to prevent generation of a crack in the prism, degradation of adhesion strength of the prism, etc. from being caused by the bending stress generated by the tightening of the screw. Furthermore, by providing a prism unit with the image display element holding mechanism, it is possible to keep the positional relationship between the prism and the image display element in an accurate and stable manner, and by providing a projector with the prism unit, it is possible to achieve a high-quality image projection.

BRIEF DESCRIPTION OF THE DRAWINGS

FIGS. 9A, 9B, and 9C are schematic diagrams showing a principal part of a fourth embodiment of the image display element holding mechanism;

FIGS. 10A, 10B, and 10C are schematic diagrams showing a principal part of a fifth embodiment of the image display element holding mechanism.

DESCRIPTION OF EMBODIMENTS

Figure 1:
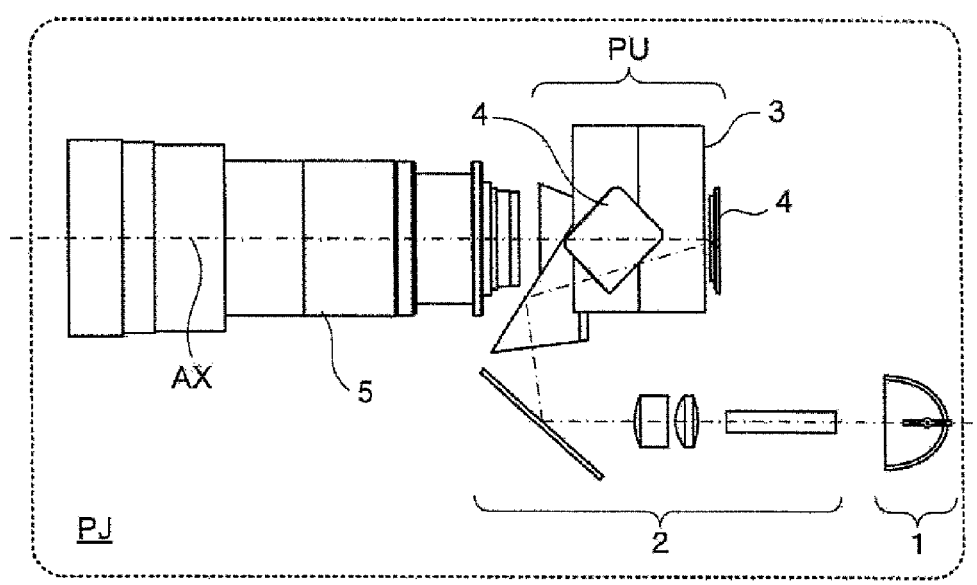
FIG. 1 is a schematic configuration diagram showing an embodiment of a projector in which an image display element holding mechanism is mounted on a prism unit.

Hereinafter, with reference to the accompanying drawings, descriptions will be given of an image display element holding mechanism, a prism unit, a projector, etc. that embody the present invention. Here, common or corresponding components and portions in embodiments, examples for comparison, and the like are identified with the same reference numerals, and overlapping descriptions thereof will be omitted where deemed appropriate.

FIG. 1 shows an embodiment of a projector PJ in which an image display element holding mechanism for holding an image display element 4 is mounted on a prism unit PU. The projector PJ shown in FIG. 1 includes a light source 1, an illumination optical system 2, a prism 3, the image display element 4, a projection lens system 5, etc. That is, the projector PJ includes the image display element 4 that displays an image, the light source 1, the illumination optical system 2 that directs light from the light source 1 to the image display element 4, and the projection lens system 5 that projects the image displayed on the image display element 4 onto a screen in an enlarged manner.

Light emitted from the light source 1 (which is, for example, a white light source such as a xenon lamp or the like, or a laser light source) is directed by the illumination optical system 2 and the prism 3 to the image display element 4, where image light is formed. The illumination optical system 2 is constituted by a rod integrator, a relay optical system, a folding mirror, etc., and the prism 3 is constituted by a TIR prism that separates illumination light from projection light and a color prism (color separating/combining prism) that separates colors of RGB (red, green, and blue) from each other and combines the colors of RGB with each other. The image display element 4 is an image modulation element (for example, a digital micromirror device) which modulates light and thereby generates an image, and the projection lens system 5 is configured to project the image displayed on the image display element 4 onto a screen surface in an enlarged manner. That is, the image light formed at the image display element 4 is projected by the projection lens system 5 toward the screen surface.

Figure 2:
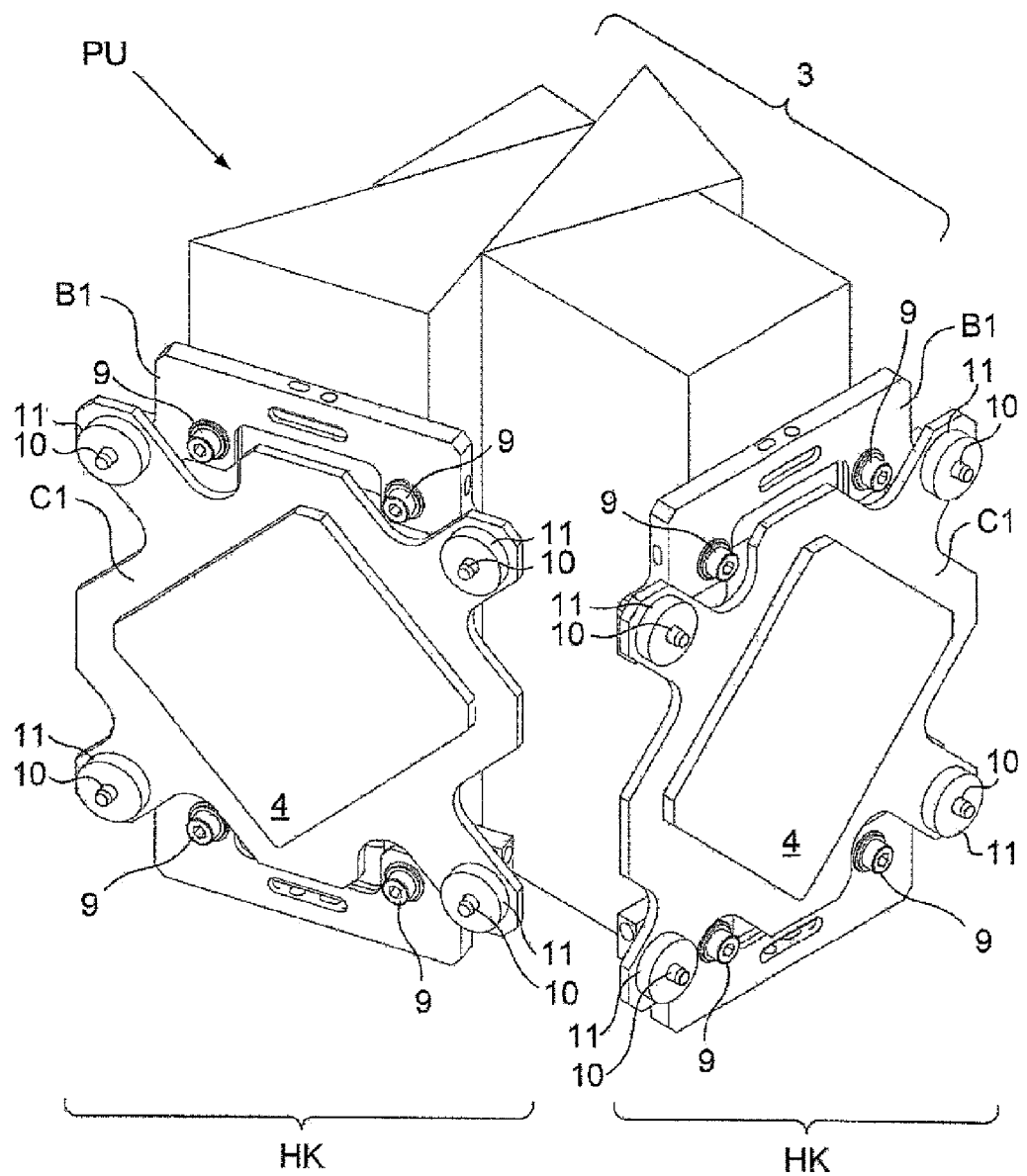
FIG. 2 is a perspective view showing first and fourth embodiments of a prism unit having an image display element holding mechanism.
Figure 3:
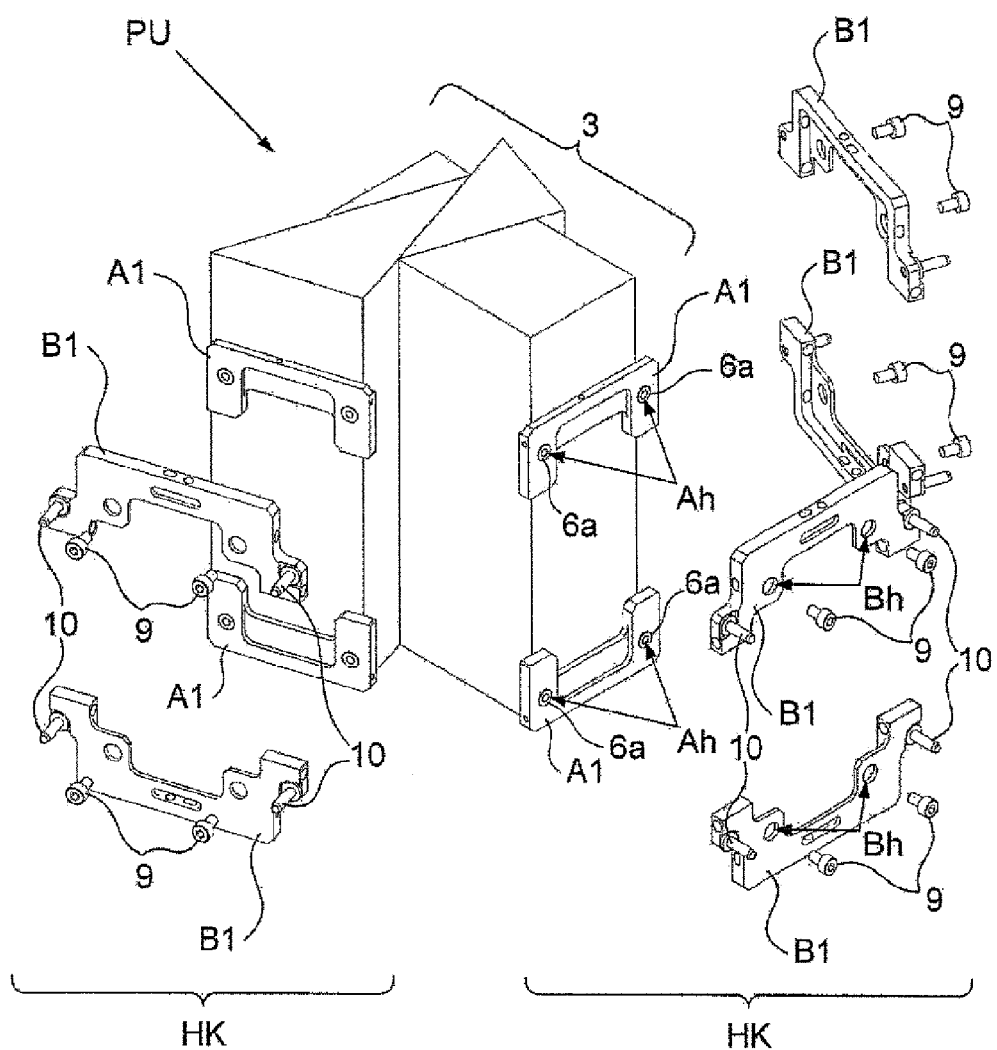
FIG. 3 is an exploded perspective view showing the first embodiment of the prism unit having the image display element holding mechanism.

An embodiment of the prism unit PU is shown in FIGS. 2 and 3. The prism unit PU is formed by integrating three image display elements 4 respectively corresponding to the colors of RGB with the prism 3, and the integration is achieved by using three sets of image display element holding mechanisms HK for holding the image display elements 4 on the prism 3. Each set of the image display element holding mechanism HK includes two pairs of a first fixing member A1 (FIG. 3) that is fixed to the prism 3 with an adhesive agent and a second fixing member B1 (FIG. 2, FIG. 3) that is fixed to the first fixing member A1 with screws 9, and to which one of the image display elements 4 is indirectly fixed. One of the two pairs of the first fixing member A1 and the second fixing member B1 is disposed on an upper part of the prism 3, and the other pair is disposed on a lower part of the prism 3. Here, the fixing with the screws 9 is achieved, as shown in FIG. 3, by using threaded holes Ah provided in the first fixing member A1, and through holes Bh provided in the second fixing member B1.

The prism 3 is a component formed of a plurality of glass prisms joined with each other, and the first fixing member A1 as a mechanical component is fixed with an adhesive agent to a glass surface of a color prism portion of the prism 3 (FIG. 3). Each of the image display elements 4 is fixed to a third fixing member C1 with an adhesive agent (FIG. 2), and the third fixing member C1 is fixed with respect to the second fixing member B1 with the fastening members 11, which are each disposed with one of pins 10 of the second fixing member B1 penetrating therethrough (FIG. 2). Specifically, the fastening members 11 fix the pins 10 of the second fixing member B1 and the third fixing member C1 to each other via a UV adhesive agent. Here, the fixing of the image display element 4 with respect to the second fixing member B1 is achieved indirectly via the third fixing member C1, but the fixing may be achieved in a simpler manner, by fixing the image display element 4 directly with respect to the second fixing member B1 with an adhesive agent.

As has been described above, each of the image display element holding mechanisms HK for holding the image display elements 4 is composed of the first fixing members A1 (FIG. 3) to which the prism 3 is bonded with an adhesive agent, the third fixing member C1 (FIG. 3) to which the image display element 4 is bonded with an adhesive agent, and the second fixing members B1 (FIG. 2, FIG. 3) that are fixed with respect to the first and third fixing members A1 and C1 with the screws 9 and the fastening members 11, respectively. The fixing with the screws achieved via the second fixing members B1 in this manner makes it possible to perform, for example, relative position adjustment between the prism 3 and the image display element 4 with ease as will be described below.

In the prism unit PU, when forming one image by superimposing images each corresponding to one of the colors of RGB that have been separated from each other, it is important to align the images of the colors of RGB with each other. Even if the alignment is performed accurately, t an adhesive agent often shrinks as it hardens during the fixing, and the shrinking of the adhesive agent invites displaced adhesive fixing. If the members joining the prism 3 and the image display element 4 to each other are all fixed with an adhesive agent, it is impossible to finely adjust the positional relationship between the prism 3 and the image display element 4 afterwards.

With this in mind, to make it possible to finely adjust the positional relationship between the prism 3 and the image display element 4 even after the adhesive fixing of the prism 3 to the first fixing member A1 and the adhesive fixing of the image display element 4 to the third fixing member C1, the second fixing member B1 is used as a component for joining the prism 3 and the image display element 4 to each other with the screws 9 and the fastening members 11. Moreover, the image display element 4 is detachable together with the third fixing member C1 to facilitate replacement of the image display element 4 if it malfunctions and needs to be replaced.

However, when fixing the second fixing member B1 to the first fixing member A1 with the screws 9, it is necessary to prevent axial force, which is generated when the screws 9 are tightened, from adversely affecting an adhesion surface of the prism 3 with respect to the first fixing member A1. If there is a warp or poor flatness in contact surfaces of the first fixing member A1 and the second fixing member B1, the tightening of the screws causes one of the contact surfaces to move toward the other for full contact with each other, and this generates bending stress. The bending stress invites a crack or a chip in the prism 3 at the adhesion surface, or peels off the adhesive agent to cause degradation in strength of adhesion between the prism 3 and the first fixing member A1.

Figure 4A:
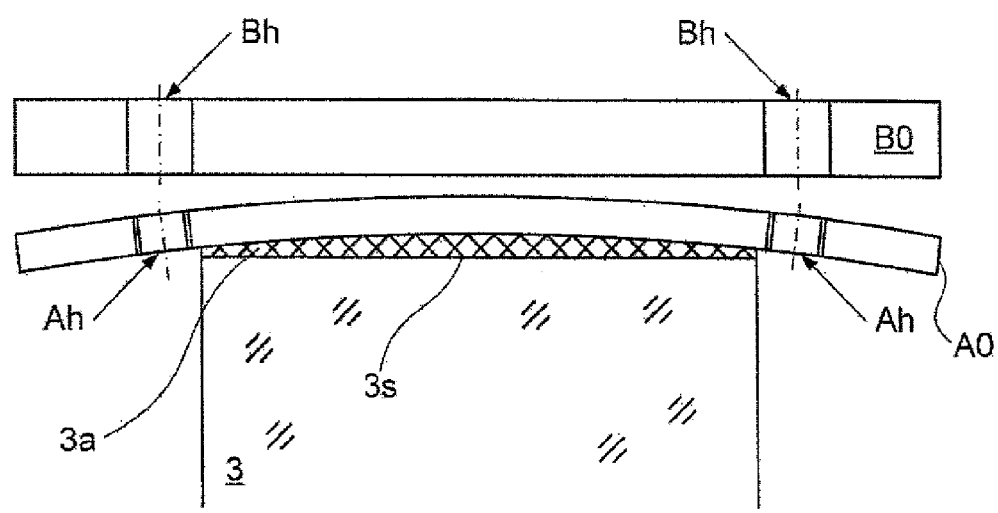
FIGS. 4A and 4B are sectional views schematically showing an image display element holding mechanism for comparison.
Figure 4B:
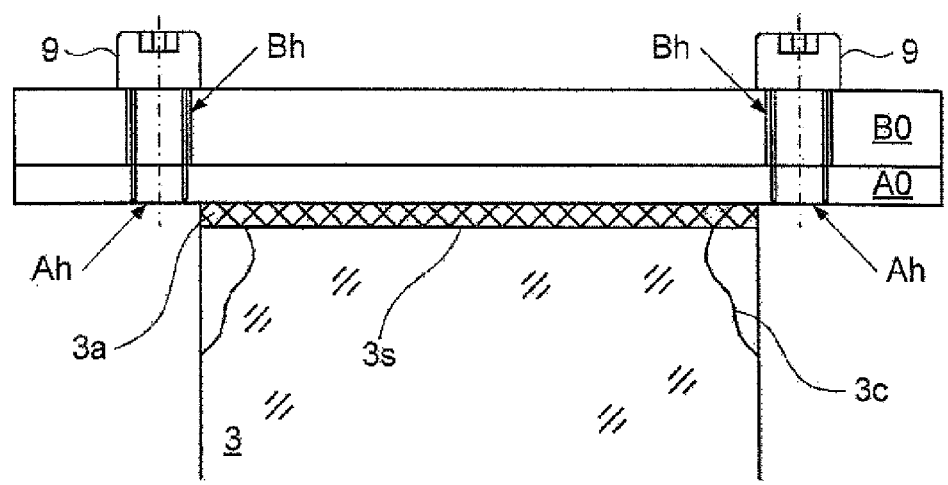

For comparison, FIGS. 4A and 4B show an embodiment of the image display element holding mechanism HK of a case where the first fixing member A1 has a warp due to part accuracy or the like. FIGS. 4A and 4B are sectional views each showing the prism 3 and first and second fixing members A0 and B0 as viewed from above, FIG. 4A showing a state before the first fixing member A0 and the second fixing member B0 are fixed to each other with screws 9, FIG. 4B showing a state after the first fixing member A0 and the second fixing member B0 are fixed to each other with the screws 9. When the screws 9 are tightened, the first fixing member A0 moves toward the second fixing member B0 for full contact with each other, and this generates bending stress. In other words, the warp of the first fixing member A0 is straightened, and thereby bending stress is generated which works to peel off an adhesive agent 3a. The bending stress is applied in a concentrated manner to an adhesion surface 3s of the prism 3 with respect to the first fixing member A0, which may invite a crack 3c in the prism 3 at a boundary between the prism 3 and the adhesive agent 3a.

Figure 5A:
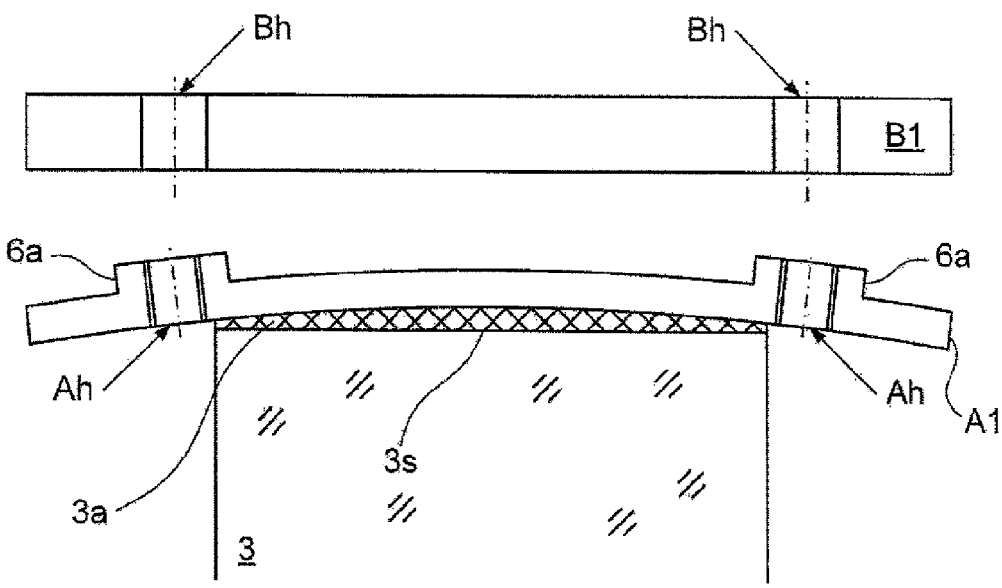
FIGS. 5A and 5B are sectional views schematically showing a first embodiment of the image display element holding mechanism.
Figure 5B:
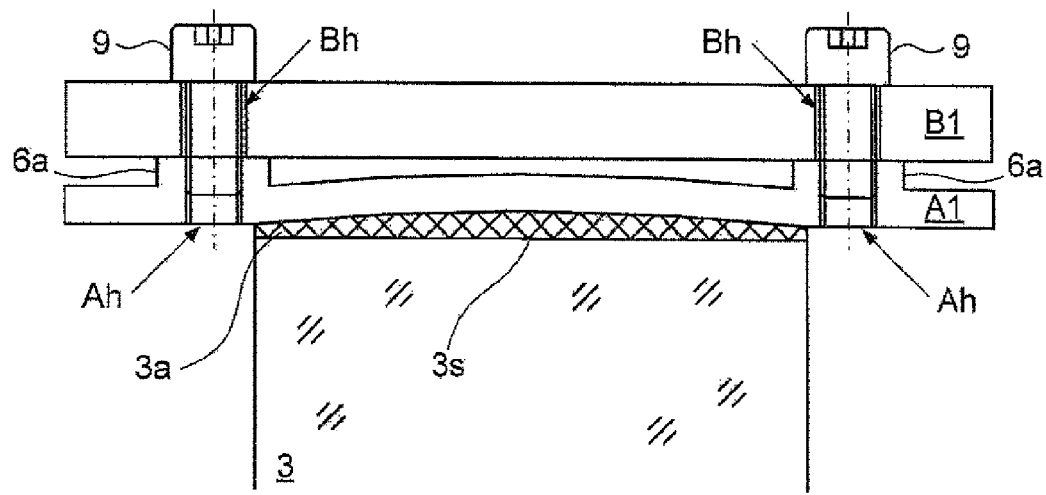

To prevent this, according to a first embodiment of the image display element holding mechanism HK, the first fixing member A1 is provided with protrusions 6a as shown in FIGS. 5A and 5B. FIGS. 5A and 5B are sectional views each showing the prism 3, the first fixing member A1, and the second fixing member B1 as viewed from above, FIG. 5A showing a state before the first fixing member A1 and the second fixing member B1 are fixed to each other with screws 9, FIG. 5B showing a state after the first fixing member A1 and the second fixing member B1 are fixed to each other with the screws 9.

The protrusions 6a are formed around the threaded holes Ah used for the fixing with the screws 9, and the protrusions 6a are integrally formed with the first fixing member A1. The image display element holding mechanism HK of the present embodiment is configured such that the first fixing member A1 and the second fixing member B1 come into direct contact with each other at the protrusions 6a so that distortion will not be caused in an adhesion area of the first fixing member A1 by tightening the screws 9 when fixing the second fixing member B1 to the first fixing member A1 with the screws 9 (for example, there are at least two fixing positions). Moreover, the protrusions 6a are each formed to circularly surround one of the threaded holes Ah used for the fixing with the screws 9, and this allows the fixing with the screws to be performed in a stable manner.

With this image display element holding mechanism HK, since the first fixing member A1 and the second fixing member B1 do not need to contact each other at portions other than the protrusions 6a, distortion of the first fixing member A1 is reduced, and thus no stress is generated to peel off the adhesive agent 3a. That is, when the screws 9 are tightened, surfaces of the first fixing member A1 and the second fixing member B1 are not in contact with each other between the two protrusions 6a, and thus no stress is applied to the adhesion surface 3s from the warped surface of the first fixing member A1.

This makes distortion less likely to occur in the first fixing member A1 in the adhesion area located between the fixing positions, and thus, it is possible to prevent bending stress generated by the tightening of the screws 9 between the first and second fixing members A1 and B1 from being applied to the adhesion surface 3s of the prism 3 with respect to the first fixing member A1. As a result, it is possible to prevent generation of a crack in the prism 3, degradation of adhesion strength of the prism 3, etc. from being caused by the bending stress generated by the tightening of the screws 9. Moreover, the adhesive agent 3a is allowed to exert its original characteristics to hold the prism 3, and this helps achieve a range of usable temperature wider than has conventionally been achieved. Furthermore, by providing the prism unit PU with the image display element holding mechanism HK, it is possible to keep the positional relationship between the prism 3 and the image display element 4 in an accurate and stable manner, and by providing a projector PJ with the prism unit PU, it is possible to achieve a high-quality image projection.

In order to prevent a surface of the first fixing member A1 and a surface of the second fixing member B1 that face each other from contacting each other at positions other than the positions at which the first and second fixing members A1 and B1 are fixed to each other with the screws 9, it may be preferable in some embodiments that the protrusions 6a have a height equal to or larger than a sum of flatnesses of the surface of the first fixing member A1 and the surface of the second fixing member B1 that face each other (the flatness of a surface is measured by the difference between the highest and lowest points over the length of the surface, and corresponds to part accuracy). For example, when the flatnesses of the facing surfaces of the first and second fixing members A1 and B1 are 0.1 mm and 0.05 mm, respectively, it may be preferable in some embodiments that the height of the protrusions 6a be 0.15 mm or larger.

Axial force Ff generated when a screw is tightened is expressed by the following formula: $Ff=T/(K \times d)$ (where T represents tightening torque (N·m); K represents a torque coefficient; and d represents a nominal diameter of the screw (mm)) For example, when an M3 screw (d=3) with a torque coefficient K of 0.2 is tightened with force having a tightening torque T of 0.63(N·m), the axial force Ff generated in the vicinity of a threaded hole Ah is 1050N. Note that, since distortion of the first fixing member A1 in the adhesion area is reduced, no undesired stress is applied to the adhesion surface 3s even when the axial force Ff is applied around the threaded holes Ah (this applies also to other embodiments).

By tightening the screws 9 against biasing force between the first and second fixing members A1 and B1, it is possible to adjust the relative position of the image display element 4 with respect to the prism 3. The screws 9 fix the first fixing member A1 and the second fixing member B1 to each other by being inserted through the through holes Bh (FIG. 3, etc.) formed in the second fixing member B1 into screw-engagement with the threaded holes Ah formed in the first fixing member A1. In the above fixing achieved with the screws, for example, by arranging an elastic member (not shown) such as a spring or the like between the first and second fixing members A1 and B1 such that the screws 9 are tightened against biasing force between the first and second fixing members A1 and B1, pushing and pulling between the screws 9 and the elastic member helps finely adjust the relative position of the image display element 4 with respect to the prism 3 in an optical-axis direction. This adjustment mechanism is applicable also to other embodiments.

An example of a material of the first fixing member A1 and the second fixing member B1 (and of first fixing members A2 and A3, second fixing members B2 and B3, a spacer 7, etc. which will be described later) is SUS430. In some embodiments, SUS430 may be preferable as the material in view of relationship with prism materials in terms of elasticity, linear expansion coefficient, etc. The adhesive agent 3a, which is used to fix the prism 3 and the first fixing member A1 to each other, may preferably be an epoxy resin adhesive agent in some embodiments.

Figure 6A:
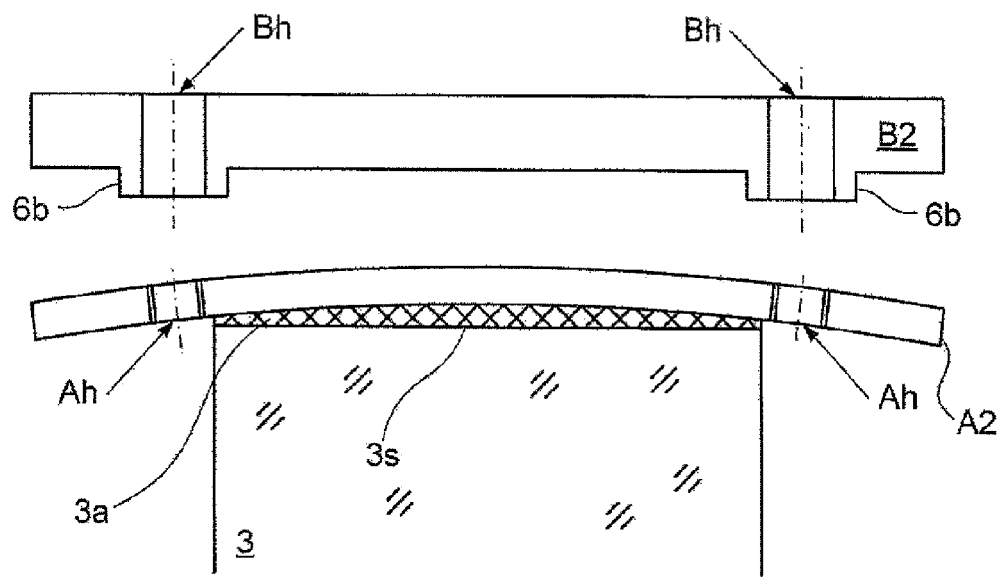
FIGS. 6A and 6B are sectional views schematically showing a second embodiment of the image display element holding mechanism.
Figure 6B:
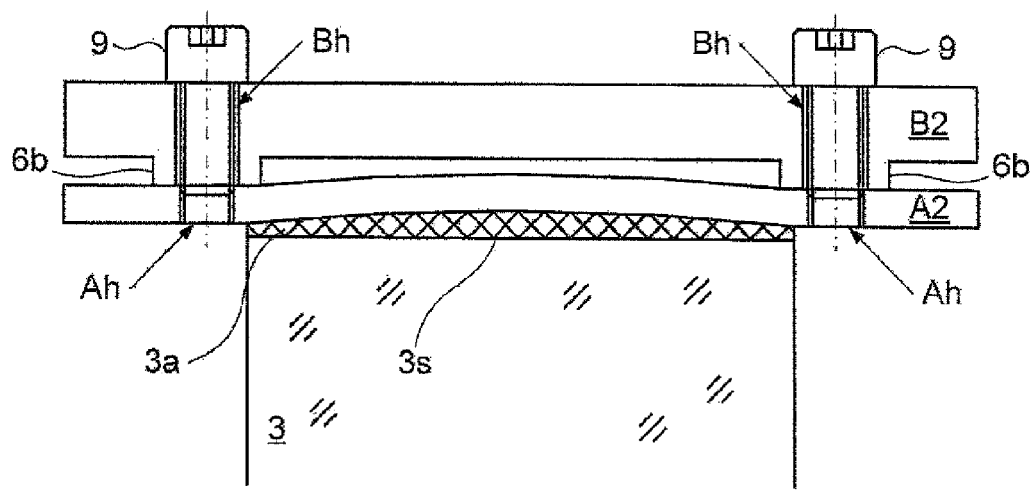

FIGS. 6A and 6B show a second embodiment of the image display element holding mechanism HK. FIGS. 6A and 6B are sectional views each showing the prism 3, a first fixing member A2, and a second fixing member B2 as viewed from above, FIG. 6A showing a state before the first fixing member A2 and the second fixing member B2 are fixed to each other with the screws 9, FIG. 6B showing a state after the first fixing member A2 and the second fixing member B2 are fixed to each other with the screws 9.

Protrusions 6b are formed around the through holes Bh used for the fixing with the screws 9, and the protrusions 6b are integrally formed with the second fixing member B2. The image display element holding mechanism HK of the present embodiment is configured such that the first fixing member A2 and the second fixing member B2 come into direct contact with each other at the protrusions 6b so that distortion will not be caused in an adhesion area of the first fixing member A2 by tightening the screws 9 when fixing the second fixing member B2 to the first fixing member A2 with the screws 9 (for example, there are at least two fixing positions). Moreover, the protrusions 6b are each formed to circularly surround one of the through holes Bh used for the fixing with the screws 9, and this allows the fixing with the screws to be performed in a stable manner. The present embodiment is different from the first embodiment (FIGS. 5A, 5B) in that, as described above, the protrusions 6b are integrally formed with the second fixing member B2.

With this image display element holding mechanism HK, since the first fixing member A2 and the second fixing member B2 do not have to contact each other at portions other than the protrusions 6*b*, distortion of the first fixing member A2 is reduced, and thus no stress is generated to peel off the adhesive agent 3*a*. That is, when the screws 9 are tightened, surfaces of the first fixing member A2 and the second fixing member B2 are not in contact with each other between the two protrusions 6*b*, and thus no stress is applied to the adhesion surface 3*s* from the warped surface of the first fixing member A2.

This makes distortion less likely to occur in the first fixing member A2 in the adhesion area located between the fixing positions, and as a result, it is possible to prevent bending stress generated by the tightening of the screws 9 between the first and second fixing members A2 and B2 from being applied to the adhesion surface 3*s* of the prism 3 with respect to the first fixing member A2. As a result, it is possible to prevent generation of a crack in the prism 3, degradation of adhesion strength of the prism 3, etc. from being caused by the bending stress generated by the tightening of the screws 9. Moreover, the adhesive agent 3*a* is allowed to exert its original characteristics to hold the prism 3, and this helps achieve a range of usable temperature wider than has conventionally been achieved. Furthermore, by providing the prism unit PU with the image display element holding mechanism HK, it is possible to keep the positional relationship between the prism 3 and the image display element 4 in an accurate and stable manner, and by providing a projector PJ with the prism unit PU, it is possible to achieve a high-quality image projection.

As in the first embodiment described above, in order to prevent a surface of the first fixing member A2 and a surface of the second fixing member B2 that face each other from contacting each other at positions other than the positions at which the first and second fixing members A2 and B2 are fixed to each other with the screws 9, it may be preferable in some embodiments that the protrusions 6*b* have a height equal to or larger than a sum of flatnesses of the surface of the first fixing member A2 and the surface of the second fixing members B2 that face each other. For example, when the flatnesses of the facing surfaces of the first and second fixing members A2 and B2 are 0.1 mm and 0.05 mm, respectively, it may be preferable in some embodiments that the height of the protrusions 6*a* be 0.15 mm or larger.

Figure 7A:
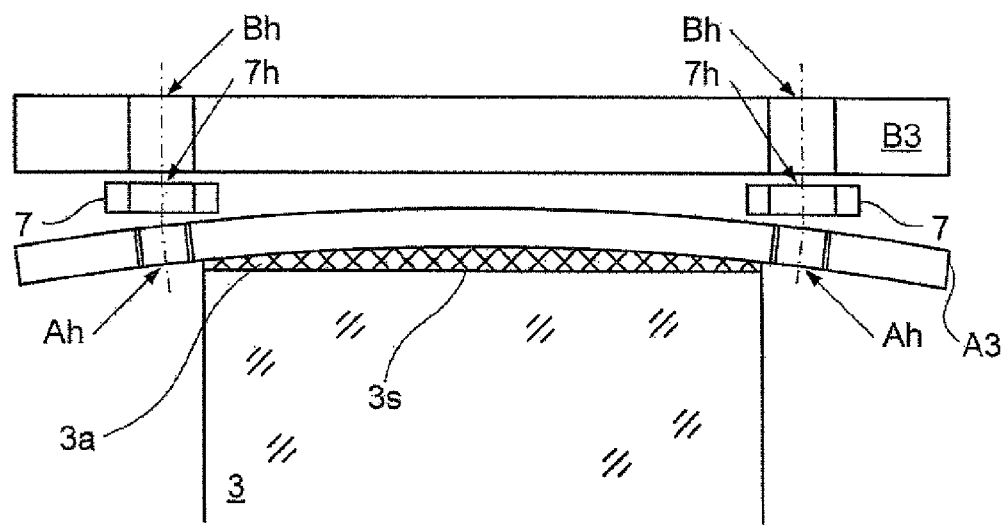
FIGS. 7A and 7B are sectional views schematically showing a third embodiment of the image display element holding mechanism.
Figure 7B:
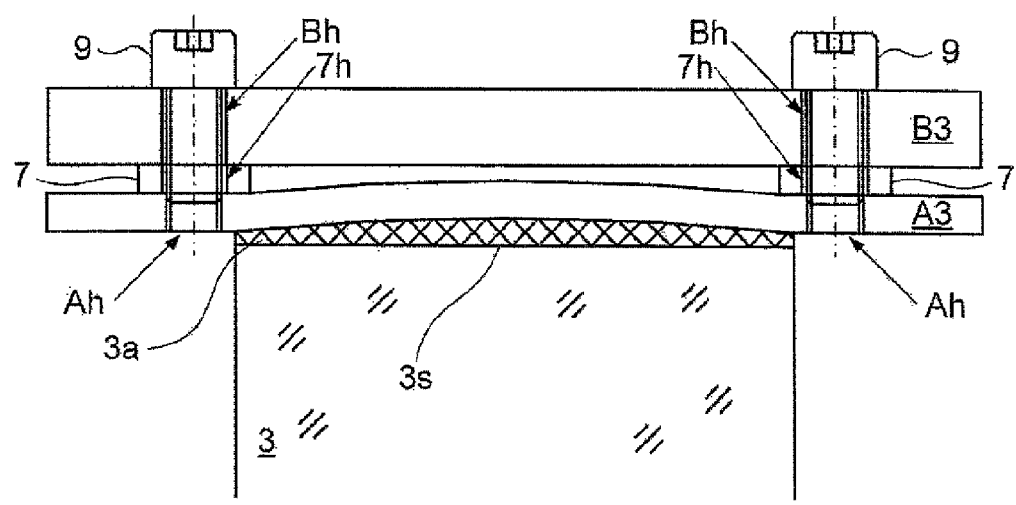

FIGS. 7A and 7B show a third embodiment of the image display element holding mechanism HK. FIGS. 7A and 7B are sectional views each showing the prism 3, a first fixing member A3, and a second fixing member B3 as viewed from above, FIG. 7A showing a state before the first fixing member A3 and the second fixing member B3 are fixed to each other with the screws 9, FIG. 7B showing a state after the first fixing member A3 and the second fixing member B3 are fixed to each other with the screws 9.

Around the threaded holes Ah and the through holes Bh used for the fixing with the screws 9, there are provided spacers 7 having holes 7*h* coaxial with the threaded holes Ah and the through holes Bh. The spacers 7 are configured to be detachable from the first fixing member A3 and the second fixing member B3. The image display element holding mechanism HK of the present embodiment is configured such that the first fixing member A3 and the second fixing member B3 come into indirect contact with each other via the spacers 7 so that distortion will not be caused in an adhesion area of the first fixing member A3 by tightening the screws 9 when fixing the second fixing member B3 to the first fixing member A3 with the screws 9 (for example, there are at least two fixing positions). The present embodiment is different from the first and second embodiments (FIGS. 5A and 5B, FIGS. 6A and 6B) in that, as described above, the spacers 7 which correspond to the protrusions 6*a* and protrusions 6*b* are provided between the first fixing member A3 and the second fixing member B3. Here, washers are used as the spacers 7, for example, and the holes 7*h* formed in centers of the spacers 7 may be as large as or larger than the through holes Bh. In cases including the case where washers are used as the spacers 7, too, it may be preferable in some embodiments for stable fixing with the screws that the washers occupy 90% or more (in angle) of areas around the threaded holes Ah used for the fixing with the screws 9.

With this image display element holding mechanism HK, since the first fixing member A3 and the second fixing member B3 do not need to contact each other at portions other than the positions at which the first fixing member A3 and the second fixing member B3 contact each other via the spacers 7, distortion of the first fixing member A3 is reduced, and thus no stress is generated to peel off the adhesive agent 3*a*. That is, when the screws 9 are tightened, surfaces of the first fixing member A3 and the second fixing member B3 are not in contact with each other between the two spacers 7, and thus no stress is applied to the adhesion surface 3*s* from the warped surface of the first fixing member A3.

This makes distortion less likely to occur in the first fixing member A3 in the adhesion area between the fixing positions, and as a result, it is possible to prevent bending stress generated by the tightening of the screws 9 between the first and second fixing members A3 and B3 from being applied to the adhesion surface 3*s* of the prism 3 with respect to the first fixing member A3. As a result, it is possible to prevent generation of a crack in the prism 3, degradation of adhesion strength of the prism 3, etc. from being caused by the bending stress generated by the tightening of the screws 9. Moreover, the adhesive agent 3*a* is allowed to exert its original characteristics to hold the prism 3, and this helps achieve a range of usable temperature wider than has conventionally been achieved. Furthermore, by providing the prism unit PU with the image display element holding mechanism HK, it is possible to keep the positional relationship between the prism 3 and the image display element 4 in an accurate and stable manner, and by providing a projector PJ with the prism unit PU, it is possible to achieve a high-quality image projection.

As in the first and second embodiments described above, in order to prevent a surface of the first fixing member A3 and a surface of the second fixing member B3 that face each other from contacting each other at positions other than the positions at which the first and second fixing members A3 and B3 are fixed to each other with the screws 9, it may be preferable that the spacers 7 have a thickness equal to or larger than a sum of flatnesses of the surface of the first fixing member A3 and the surface of the second fixing member B3 that face each other. For example, when the flatnesses of facing surfaces of the first and second fixing members A3 and B3 are 0.1 mm and 0.05 mm, respectively, it may be preferable that the thickness of the spacers 7 be 0.15 mm or larger.

Figure 8:
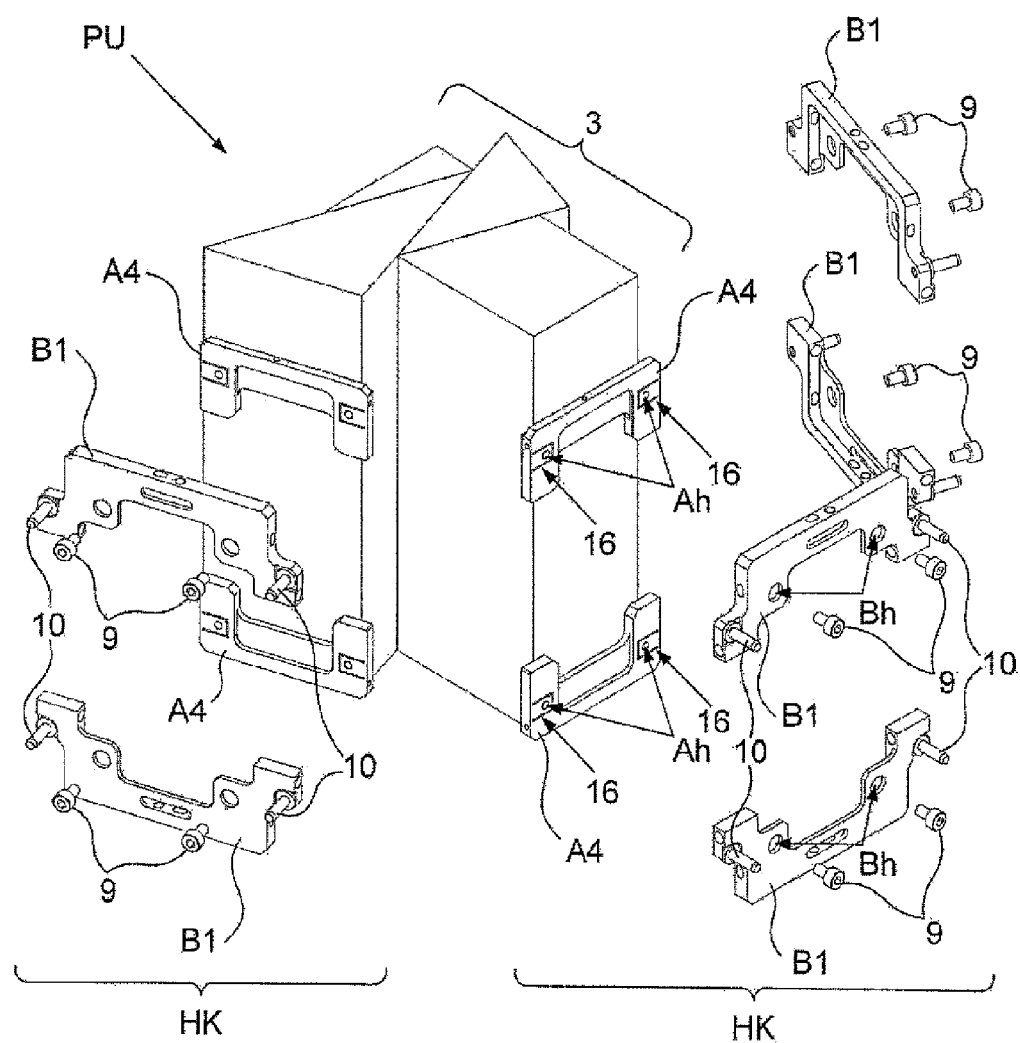
FIG. 8 is an exploded perspective view showing the fourth embodiment of the prism unit having the image display element holding mechanism.

Still another embodiment of the prism unit PU is shown in FIGS. 2 and 8. The prism unit PU is formed by integrating three image display elements 4 respectively corresponding to the colors of RGB and the prism 3 together with three sets of image display element holding mechanisms HK for holding the image display elements 4 on the prism 3. Each of the image display element holding mechanisms HK has two pairs of a first fixing member A4 (FIG. 8) that is fixed to the prism 3 with an adhesive agent, and the second fixing member B1 (FIG. 2, FIG. 8) that is fixed to the first fixing member A4 with the screws 9 and to which one of the image display elements 4 is indirectly fixed. One of the two pairs of the first fixing member A4 and the second fixing member B1 is disposed on an upper part of the prism 3, and the other pair is disposed on a lower part of the prism 3. Here, the fixing with the screws 9 is achieved, as shown in FIG. 8, by using the threaded holes Ah formed in the first fixing member A4, and the through holes Bh formed in the second fixing member B1.

The prism 3 is a component formed of a plurality of glass prisms joined with each other, and the first fixing member A4 as a mechanical component is fixed with an adhesive agent to a glass surface of a color prism portion of the prism 3 (FIG. 8). The image display element 4 is fixed to the third fixing member C1 with an adhesive agent (FIG. 2), and the third fixing member C1 is fixed with respect to the second fixing member B1 with the fastening members 11, which are each disposed with one of pins 10 of the second fixing member B1 penetrating therethrough (FIG. 2). Specifically, the fastening members 11 fasten the pins 10 of the second fixing member B1 and the third fixing member C1 to each other via a UV adhesive agent. Here, the fixing of the image display element 4 with respect to the second fixing member B1 is achieved indirectly via the third fixing member C1, but the fixing may be achieved in a simpler manner by fixing the image display element 4 directly with respect to the second fixing member B1 with an adhesive agent.

As has been described above, each of the image display element holding mechanisms HK for holding the image display elements 4 is composed of the first fixing members A4 (FIG. 8) to which the prism 3 is bonded with an adhesive agent, the third fixing member C1 (FIG. 8) to which the image display element 4 is bonded with an adhesive agent, and the second fixing members B1 (FIG. 2, FIG. 8) that are fixed with respect to the first and third fixing members A4 and C1 with the screws 9 and the fastening members 11, respectively. The fixing with screws achieved via the second fixing members B1 in this manner makes it possible to perform, for example, relative position adjustment between the prism 3 and the image display element 4 with ease as will be described below.

In the prism unit PU, in forming one image by superimposing images each corresponding to one of the colors of RGB that have been separated from each other, it is important to align the images of the colors of RGB with each other. Even if the alignment is performed accurately, an adhesive agent often shrinks as it hardens during the fixing, and the shrinking of the adhesive agent invites displaced adhesive fixing. If the members joining the prism 3 and the image display element 4 to each other are all fixed with an adhesive agent, it is impossible to finely adjust the positional relationship between the prism 3 and the image display element 4 afterwards.

With this in mind, to make it possible to finely adjust the positional relationship between the prism 3 and the image display element 4 even after the adhesive fixing of the prism 3 to the first fixing member A4 and the adhesive fixing of the image display element 4 to the third fixing member C1, the second fixing member B1 is used as a component for joining the prism 3 and the image display element 4 to each other with the screws 9 and the fastening members 11. Moreover, the image display element 4 is detachable together with the third fixing member C1 to facilitate replacement of the image display element 4 if it malfunctions and needs to be replaced.

However, when fixing the second fixing member B1 to the first fixing member A4 with the screws 9, it is necessary to prevent axial force, which is generated when the screws 9 are fastened, from adversely affecting the adhesion surface of the prism 3 with respect to the first fixing member A4. If there is a warp or poor flatness of the contact surfaces of the first fixing member A4 and the second fixing member B1, the fastening of the screws 9 causes one of the adhesion surfaces to move toward the other for full contact with the other, and this generates bending stress. The bending stress invites a crack or a chip in the prism 3 at the adhesion surface, or peels off the adhesive agent to cause degradation in strength of adhesion between the prism 3 and the first fixing member A4.

To prevent this, according to a fourth embodiment of the image display element holding mechanism HK, the first fixing member A4 is provided with gaps (through holes) 16 as shown in FIGS. 9A, 9B, and 9C. FIG. 9A shows the prism 3 and the first fixing member A4 in section as viewed from above, and FIG. 9C shows the prism 3 and the first fixing member A4 in section as viewed from the front side. FIG. 9B shows a principal part P in FIG. 9C in an enlarged manner. Buffer portions 16a (FIG. 9B) are provided in the first fixing member A4 for absorbing bending stress generated by tightening of the screws 9 when fixing the second fixing member B1 to the first fixing member A4 with the screws 9 (FIG. 8). The first fixing member A4 has the gaps 16 each disposed between an adhesion surface 3s with respect to the prism 3 (that is, an area where the adhesive agent 3a is applied) and one of positions at which the tightening of the screws 9 is received (around the threaded holes Ah), and the buffer portions 16a are formed by providing the gaps 16.

Without the gaps 16 in the first fixing member A4, the first fixing member A4 would have a uniform shape, and thus the bending stress would be applied in a concentrated manner to the adhesion surface 3s of the prism 3 with respect to the first fixing member A4. In contrast, with the image display element holding mechanism HK of the present embodiment, the buffer portions 16a located one at a root of the U-shaped gaps 16 are liable to be distorted when the screws 9 are tightened, and thus the bending stress is applied to the buffer portions 16a in a concentrated manner, and the buffer portions 16a bend and thereby absorb the bending stress. This happens because the buffer portions 16a each having a small width are the lowest in strength in areas around the threaded holes Ah.

This makes it possible to prevent the bending stress generated by the tightening of the screws 9 between the first and second fixing members A4 and B1 from being applied to the adhesion surface 3s of the prism 3 with respect to the first fixing member A4. As a result, it is possible to prevent generation of a crack in the prism 3, degradation of adhesion strength of the prism 3, etc. from being caused by the bending stress generated by the tightening of the screws 9. Furthermore, by providing the prism unit PU with the image display element holding mechanism HK, it is possible to keep the positional relationship between the prism 3 and the image display element 4 in an accurate and stable manner, and by providing a projector PJ with the prism unit PU, it is possible to achieve a high-quality image projection.

It may be preferable in some embodiments that the width of the buffer portions 16a at the roots of the U-shaped gap 16 be equal to or smaller than the thickness of the first fixing member A4. For example, when the thickness of the first fixing member A4 is 3 mm it may be preferable in some embodiments that the width of the buffer portions 16a be 3 mm or smaller. If the width of the buffer portions 16a is larger than the thickness of the first fixing member A4, the bending stress is less likely to be absorbed by the buffer portions 16*a*. It may also be preferable in some embodiments for the buffer portions 16*a* to bend within a range of elastic deformation to absorb the bending stress.

Axial force Ff generated when a screw is tightened is expressed by the following formula: Ff=T/(K×d) (where T represents tightening torque (N·m); K represents a torque coefficient; and d represents a nominal diameter of the screw (mm)) For example, when an M3 screw (d=3) with a torque coefficient K of 0.2 is tightened with force with a tightening torque T of 0.63(N·m), the axial force Ff generated in the vicinity of a screw hole Ah is 1050N. Here, even when the axial force Ff is applied to areas around the threaded holes Ah, the absorption of the stress by the buffer portions 16*a* helps reduce transfer of the stress to the adhesion surface 3*s*.

By tightening the screws 9 against biasing force between the first and second fixing members A4 and B1, it is possible to adjust the relative position of the image display element 4 with respect to the prism 3. The screws 9 fix the first fixing member A4 and the second fixing member B1 to each other by being inserted through the through holes Bh (FIG. 8) formed in the second fixing member B1 into screw-engagement with the threaded holes Ah formed in the first fixing member A4. In the above fixing achieved with the screws, for example, by arranging an elastic member (not shown) such as a spring or the like between the first and second fixing members A4 and B1 such that the screws 9 are tightened against biasing force between the first and second fixing members A4 and B1, pushing and pulling between the screws 9 and the elastic member helps finely adjust the relative position of the image display element 4 with respect to the prism 3 in an optical-axis direction.

An example of a material of the first fixing member A4 and the second fixing member B1 is SUS430. In some embodiments, SUS430 may be preferable as the material in view of relationship with prism materials in terms of elasticity, linear expansion coefficient, etc. The adhesive agent 3*a*, which is used to fix the prism 3 and the first fixing member A4 to each other, may preferably be an epoxy resin adhesive agent in some embodiments.

FIGS. 10A, 10B, and 10C show a fifth embodiment of the image display element holding mechanism HK. FIG. 10A shows the prism 3 and a first fixing member A5 in section as viewed from above, and FIG. 10C shows the prism 3 and the first fixing member A5 in section as viewed from the front side. FIG. 10B shows a principal part Q in FIG. 10C in an enlarged manner. The present embodiment is different from the fourth embodiment (FIG. 9) in that the first fixing member A5 has cuts 17 each disposed between an adhesion surface 3*s* with respect to the prism 3 and one of positions at which the tightening of the screws 9 is received, and buffer portions 17*a* are formed by providing the cuts 17.

Buffer portions 17*a* are provided in the first fixing member A5 for absorbing bending stress generated by tightening of the screws 9 when fixing the second fixing member B1 (the same as the one in the forth embodiment shown in FIG. 8) to the first fixing member A5 with the screws 9. The cuts 17 formed in the first fixing member 5 are each disposed between the adhesion surface 3*s* with respect to the prism 3 (that is, an area where the adhesive agent 3*a* is applied) and one of positions at which the screws 9 are tightened (around the threaded holes Ah), and the buffer portions 17*a* are formed by providing the cuts 17.

Without the cuts 17 in the first fixing member A5, the first fixing member A5 would have a uniform shape, and thus the bending stress would be applied in a concentrated manner to the adhesion surface 3*s* of the prism 3 with respect to the first fixing member A5. In contrast, according to the image display element holding mechanism HK of the present embodiment, the buffer portions 17*a* located one between roots of two adjacent ones of the cuts 17 are liable to be distorted when the screws 9 are tightened, and thus the bending stress is applied to the buffer portions 17*a* in a concentrated manner, and the buffer portions 17*a* bend and thereby absorb the bending stress. This happens because the buffer portions 17*a* forming boundaries with respect to the adhesion surface 3*s* are the lowest in strength in areas around the threaded holes Ah.

Consequently, it is possible to prevent the bending stress generated by the tightening of the screws 9 between the first and second fixing members A5 and B1 from being applied to the adhesion surface 3*s* of the prism 3 with respect to the first fixing member A4. As a result, it is possible to prevent generation of a crack in the prism 3, degradation of adhesion strength of the prism 3, etc. from being caused by the bending stress generated by the tightening of the screws 9. Furthermore, by providing the prism unit PU with the image display element holding mechanism HK, it is possible to keep the positional relationship between the prism 3 and the image display element 4 in an accurate and stable manner, and by providing a projector PJ with the prism unit PU, it is possible to achieve a high-quality image projection.

Figure 11A:
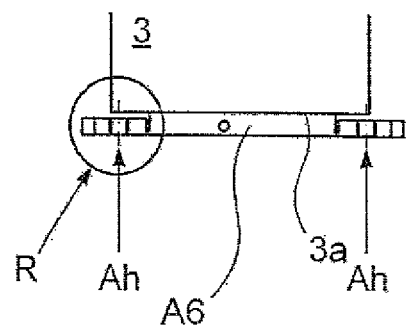
FIGS. 11A, 11B, and 11C are schematic diagrams showing a principal part of a sixth embodiment of the image display element holding mechanism.
Figure 11B:
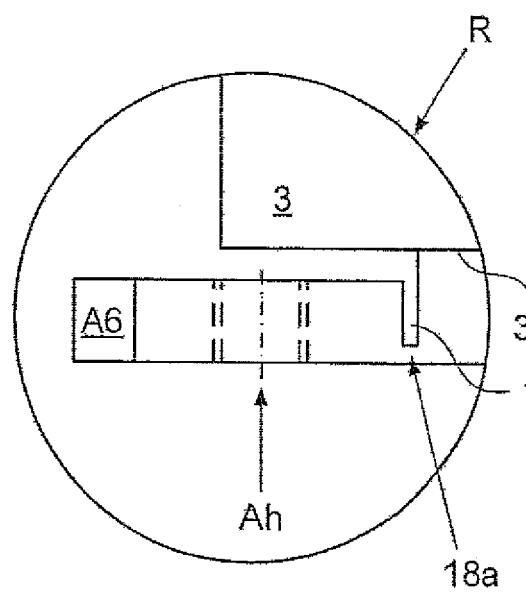
Figure 11C:
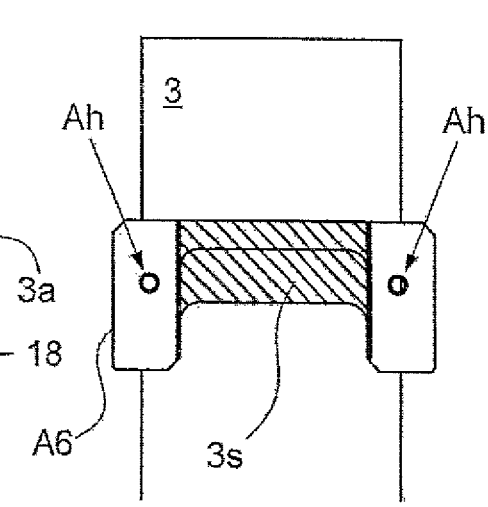

FIGS. 11A, 11B, and 11C show a sixth embodiment of the image display element holding mechanism HK. FIG. 11A shows the prism 3 and a first fixing member A6 in section as viewed from above, and FIG. 11C shows the prism 3 and the first fixing member A6 in section as viewed from the front side. FIG. 11B shows a principal part R in FIG. 11A in an enlarged manner. The present embodiment is different from the fourth embodiment (FIGS. 9A, 9B, 9C) in that the first fixing member A6 has recesses 18 each disposed between an adhesion surface 3*s* with respect to the prism 3 and one of positions at which the tightening of the screws 9 is received, and buffer portions 18*a* are formed as thin-walled portions by providing the recesses 18.

The buffer portions (thin-walled portions) 18*a* are provided in the first fixing member A6 for absorbing bending stress generated by tightening of the screws 9 when fixing the second fixing member B1 (the same as the one in the fourth embodiment shown in FIG. 8) to the first fixing member A6 with the screws 9. The first fixing member A6 has the thin-walled portions each disposed between the adhesion surface 3*s* with respect to the prism 3 (that is, an area where the adhesive agent 3*a* is applied) and one of positions at which the tightening of the screws 9 is received (around the threaded holes Ah), and the thin-walled portions are formed by providing the recesses 18, and the buffer portions 18*a* are constituted by the thin-walled portions.

Without the recesses 18 in the first fixing member A6, the first fixing member A6 would have a uniform shape, and thus the bending stress would be applied in a concentrated manner to the adhesion surface 3*s* of the prism 3 with respect to the first fixing member A6. In contrast, according to the image display element holding mechanism HK of the present embodiment, the buffer portions 18*a* located one at a root of each of the recesses 18 are liable to be distorted when the screws 9 are tightened, and thus the bending stress is applied to the buffer portions 18*a* in a concentrated manner, and the buffer portions 18*a* bend and thereby absorb the bending stress. This happens because the thin-walled buffer portions 18*a* are the lowest in strength in areas around the threaded holes Ah.

This makes it possible to prevent the bending stress generated by the tightening of the screws 9 between the first and second fixing members A6 and B1 from being applied to the adhesion surface 3s of the prism 3 with respect to the first fixing member A6. As a result, it is possible to prevent generation of a crack in the prism 3, degradation of adhesion strength of the prism 3, etc. from being caused by the bending stress generated by the tightening of the screws 9. Furthermore, by providing the prism unit PU with the image display element holding mechanism HK, it is possible to keep the positional relationship between the prism 3 and the image display element 4 in an accurate and stable manner, and by providing a projector PJ with the prism unit PU, it is possible to achieve a high-quality image projection.

It may be preferable in some embodiments that the thickness of the buffer portions 18a that absorb the bending stress by being formed as thin-walled portions be equal to or smaller than one-third of a thickness of the first fixing member A6. For example, when the thickness of the first fixing member A6 is 3 mm, it may be preferable in some embodiments that the thickness of the buffer portions 18a be 1 mm or smaller. If the thickness of the buffer portions 18a is larger than the thickness of the first fixing member A6, the bending stress is less likely to be absorbed by the buffer portions 18a. It may also be preferable in some embodiments for the buffer portions 18a to bend within a range of elastic deformation to absorb the bending stress.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

LIST OF REFERENCE SIGNS

PJ projector
PU prism unit
HK holding mechanism
1 light source
2 illumination optical system
3 prism
3a adhesive agent
3s adhesion surface
4 image display element
5 projection lens system
6a, 6b protrusion
7 spacer (protrusion)
9 screw
10 pin
11 fastening member
16 gap (through hole)
16a buffer portion
17 cut
17a buffer portion
18 recess
18a buffer portion (thin-walled portion)
Ah threaded hole
Bh through hole
A1~A6 first fixing member
B1~B3 second fixing member
C1 third fixing member

The invention claimed is:

1. An image display element holding mechanism for holding an image display element on a prism, comprising:
 a first fixing member that is fixed to a prism with an adhesive agent; and
 a second fixing member that is fixed to the first fixing member with a screw, and to which an image display element is directly or indirectly fixed, wherein
 a protrusion is formed around a hole that receives the screw,
 the first fixing member and the second fixing member contact each other directly or indirectly at the protrusion, and
 the protrusion prevents distortion in an adhesion area of the first fixing member generated by tightening of the screw when fixing the first fixing member to the second fixing member after the first fixing member is fixed to the prism.

2. The image display element holding mechanism according to claim 1, wherein the protrusion is integrally formed with at least one of the first fixing member and the second fixing member.

3. The image display element holding mechanism according to claim 1, wherein the protrusion is constituted by a spacer detachable from the first fixing member and the second fixing member.

4. The image display element holding mechanism according to claim 1, wherein the protrusion has a height that is equal to or larger than a sum of a flatness of a surface of the first fixing member and a flatness of a surface of the second fixing member, the surface of the first fixing member and the surface of the second fixing member facing each other, such that the surface of the first fixing member and the surface of the second fixing member facing each other are prevented from contacting each other at positions other than a position at which the first fixing member and the second fixing member are fixed to each other with the screw.

5. The image display element holding mechanism according to claim 1, wherein the protrusion is disposed so as to circularly surround the hole used for the fixing with the screw.

6. A prism unit, wherein the image display element and the prism are integrated with each other with the image display element holding mechanism according to claim 1.

7. A projector comprising the prism unit according to claim 6.

8. The image display element holding mechanism according to claim 2, wherein the protrusion has a height that is equal to or larger than a sum of a flatness of a surface of the first fixing member and a flatness of a surface of the second fixing member, the surface of the first fixing member and the surface of the second fixing member facing each other, such that the surface of the first fixing member and the surface of the second fixing member facing each other are prevented from contacting each other at positions other than a position at which the first fixing member and the second fixing member are fixed to each other with the screw.

9. The image display element holding mechanism according to claim 3, wherein the protrusion has a height that is equal to or larger than a sum of a flatness of a surface of the first fixing member and a flatness of a surface of the second fixing member, the surface of the first fixing member and the surface of the second fixing member facing each other, such that the surface of the first fixing member and the surface of the second fixing member facing each other are prevented from contacting each other at positions other than a position at which the first fixing member and the second fixing member are fixed to each other with the screw.

10. The image display element holding mechanism according to claim 2, wherein the protrusion is disposed so as to circularly surround the hole used for the fixing with the screw.

11. The image display element holding mechanism according to claim 3, wherein the protrusion is disposed so as to circularly surround the hole used for the fixing with the screw.

12. An image display element holding mechanism for holding an image display element on a prism, comprising:
a first fixing member that is fixed to the prism with an adhesive agent; and
a second fixing member that is fixed to the first fixing member with a screw, and to which the image display element is directly or indirectly fixed,
wherein the first fixing member includes a buffer portion that absorbs bending stress in an adhesion area of the first fixing member generated by tightening of the screw when fixing the second fixing member to the first fixing member after the first fixing member is fixed to the prism.

13. The image display element holding mechanism according to claim 12, wherein the first fixing member includes a gap or a cut disposed between an adhesion surface of the first fixing member with respect to the prism and a position at which the tightening of the screw is received, and the buffer portion is formed by providing the gap or the cut.

14. The image display element holding mechanism according to claim 12, wherein the first fixing member includes a thin-walled portion formed by providing a recess between an adhesion surface of the first fixing member with respect to the prism and a position at which the tightening of the screw is received, and the buffer portion is constituted by the thin-walled portion.

15. The image display element holding mechanism according to claim 12, wherein a relative position of the image display element with respect to the prism is adjustable by performing the tightening of the screw against biasing force between the first fixing member and the second fixing member.

16. The image display element holding mechanism according to claim 13, wherein a relative position of the image display element with respect to the prism is adjustable by performing the tightening of the screw against biasing force between the first fixing member and the second fixing member.

17. The image display element holding mechanism according to claim 14, wherein a relative position of the image display element with respect to the prism is adjustable by performing the tightening of the screw against biasing force between the first fixing member and the second fixing member.

18. A prism unit, wherein the image display element and the prism are integrated with each other with the image display element holding mechanism according to claim 12.

19. A projector comprising the prism unit according to claim 18.

20. A method of manufacturing a prism unit, the method comprising:
fixing a prism on a first fixing member with an adhesive agent; and
fixing, after fixing the prism on the first fixing member, a hole of a second fixing member that holds an image display element and a hole of the first fixing member with a screw,
wherein
the hole of the first fixing member is located outside of an adhesion surface of the first fixing member,
a protrusion is formed around the hole of the first fixing member or the hole of the second fixing member,
the first fixing member and the second fixing member contact each other directly or indirectly at the protrusion,
the protrusion prevents distortion in an adhesion area of the first fixing member generated by tightening of the screw when fixing the first fixing member to the second fixing member after the first fixing member is fixed to the prism.

\* \* \* \* \*